United States Patent [19]

Niessner et al.

[11] Patent Number: 5,266,638
[45] Date of Patent: Nov. 30, 1993

[54] TOUGHENED THERMOPLASTIC MOLDING MATERIAL

[75] Inventors: Norbert Niessner, Friedelsheim; Klaus Muehlbach, Gruenstadt; Friedrich Seitz, Friedelsheim, all of Fed. Rep. of Germany

[73] Assignee: BASF Aktiengesellschaft, Ludwigshafen, Fed. Rep. of Germany

[21] Appl. No.: 975,730

[22] Filed: Nov. 13, 1992

[30] Foreign Application Priority Data

Nov. 21, 1991 [DE] Fed. Rep. of Germany ....... 4138156
Mar. 4, 1992 [DE] Fed. Rep. of Germany ....... 4206766

[51] Int. Cl.$^5$ ..................... C08L 39/04; C08L 35/00; C08L 23/02
[52] U.S. Cl. ..................... 525/133; 525/146; 525/148; 525/203; 525/204; 525/207; 525/217; 525/218; 525/221
[58] Field of Search ............... 525/133, 146, 148, 203, 525/204, 207, 217, 218, 221

[56] References Cited

U.S. PATENT DOCUMENTS

| | | | |
|---|---|---|---|
| 3,236,914 | 2/1966 | Murdock et al. | 260/857 |
| 4,305,859 | 12/1981 | McEwan et al. | 260/29.6 |
| 4,579,671 | 4/1986 | Lundberg et al. | 252/8.55 |
| 4,617,337 | 10/1986 | Lundberg et al. | 524/399 |
| 4,668,737 | 5/1987 | Eichenauer et al. | 525/73 |
| 4,816,518 | 3/1989 | Keskey | 525/204 |

FOREIGN PATENT DOCUMENTS

| | | |
|---|---|---|
| 0164048 | 4/1989 | European Pat. Off. |
| 3421981 | 12/1985 | Fed. Rep. of Germany |
| 2943030 | 5/1990 | Fed. Rep. of Germany |

*Primary Examiner*—David J. Buttner
*Attorney, Agent, or Firm*—Keil & Weinkauf

[57] ABSTRACT

A thermoplastic molding material which is made up of components A, B, C, and D. Component A comprises 10-90% of the composition and is a copolymer made up of 30-95% styrene; 4-40% (meth)acrylonitrile, methyl methacrylate, or maleic anhydride; 1-30% of a monomer described by formula in the specification, N-vinylimidazole or N-vinylcarbazole; and up to 40% of a copolymerizable ethylenically unsaturated monomer. Component B comprises 10-90% of the composition and is a copolymer made up of 50-99.9% of an alpha-olefin; 0.1-50% of a monomer containing acid groups; and up to 40% of a copolymerizable ethylenically unsaturated monomer. Component C comprises up to 80% of the composition and is a copolymer made up of 50-95% styrene and 5-50% (meth)acrylonitrile, methyl methacrylate or maleic anhydride. Component D comprises up to 80% of the composition and is made up of a polycarbonate. All percentages are by weight.

1 Claim, No Drawings

TOUGHENED THERMOPLASTIC MOLDING MATERIAL

Blends of acrylate or ethylene/propyplene/diene rubbers (EPDM) with a rigid component (ie. a component having a glass transition temperature above 20° C.), for example a styrene/acrylonitrile copolymer, are known under the name ASA or AES. To prevent delamination phenomena, the rubber phase is grafted with monomers whose polymer is miscible, ie. compatible, with the rigid component. Such blends are extremely stable to weathering and are tough at room temperature. In the case of ASA, certain properties can be changed in a specific manner by incorporating comonomers in an emulsion polymerization process. For example, graft copolymers of a rubber-like grafting base which has been grafted with a mixture of styrene/acrylonitrile, a polymerizable nitrogen base and an acid containing a polymerizable double bond have been described (European Patent 164,048). These molding materials exhibit great toughness at room temperature and at the same time have a dull surface.

However, the toughness, in particular of ASA, decreases rapidly with falling temperatures. AES has the disadvantage, owing to the low concentration of unsaturated C-C double bonds in the EPDM, there is insufficient grafting of the parent EPDM rubber with, for example, styrene/acrylonitrile, and AES therefore readily tends toward delamination under impact. If the number of double bonds in the EPDM is increased, for example by polymerizing larger amounts of dienes with ethylene/propylene, the subsequent grafting is improved but the amount of unreacted C-C double bonds remaining after the grafting also increases and thus leads to poorer stability to weathering.

The expensive grafting process in the case of AES, the high costs of starting materials and the expensive emulsion polymerization process for alkyl acrylates make ASA and AES blends considerably more expensive than other blends which are less stable to weathering, for example ABS.

It is an object of the present invention to provide economical blends of thermoplastics with toughening polymers, which blends not only exhibit excellent stability to weathering and great toughness at room temperature and at low temperatures but are also more economical than the currently known toughened blends stable to weathering. Blends of modified polyolefins with modified thermoplastics are suitable for this purpose, use being made of the principle of employing a reversible interaction (acid-base interaction) for bonding modified polyolefins and modified thermoplastics. These do not include the ionomers, whose interaction is based on salt-like, non-reversible ionic bonds.

JA-A-68-0 006 108 describes an improved polypropylene (PP) fiber, obtained by grafting PP with, on the one hand, a monomer containing acid groups (eg. (meth)acrylic acid) and mixing the product with a polymer containing polymerized basic nitrogen. This process is suitable for obtaining fibers having improved color-ability, but not for the preparation of toughened polymers.

DE-A-2 943 030 describes a copolymer latex of styrene/acrylonitrile/vinylpyridine, possibly with monomers containing acid or hydroxyl groups and functional monomers, eg. N-methylol derivatives. These blends are suitable for laminates and coatings which crosslink at elevated temperatures and are insoluble or infusible, but not for the preparation of toughened thermoplastics.

U.S. Pat. No. 3,236,914 describes a process for the preparation of homogeneous polymer blends which utilizes the interaction of nitrogen atoms in polymer A and acid groups in polymer B. However, there is no indication as to whether styrene/acrylonitrile copolymers can be toughened with acid-modified olefin copolymers and base-modified SAN copolymers.

U.S. Pat. Nos. 4,617,337 and 4,579,671 describe complex formation from an at least 95% neutralized sulfonated polymer based on butyl rubber, EPDM terpolymers or copolymers of butadiene or isoprene with styrene, with a copolymer of $C_4$-$C_{12}$-alkyl methacrylates (ie. acrylate rubber) or acrylates with vinylpyridine. Although these molding materials form elastomers, owing to the thermal instability of the vinylpyridine monomer unit processing by a thermoplastic method leads to pronounced discolorations of the processed molding material.

DE-A-3 421 981, the best proposal to date, describes blends of a terpolymer of ethylene, n-butyl acrylate and acrylic acid and a copolymer matrix of styrene and dimethylaminoethyl acrylate (DMAEA), dimethylaminoethyl methacrylate (DMAEMA) and/or N-vinylimidazole (NVI). Although these blends are described as toughening components for styrene/acrylonitrile (SAN) copolymers, the compatibility of the blends described with SAN is so small that, in this case too, delamination of the monomer occurs under impact and a very low notched impact strength is observed.

We have found that this object is achieved by the novel molding materials, which contain, based on the sum of A, B, C and D, A: from 10 to 90, in particular from 20 to 80, % by weight of one or more copolymers having a glass transition temperature above 0° C. and consisting of A1: from 30 to 95, in particular from 40 to 80, % by weight of styrene or of a substituted styrene which may be described roughly by the general formula

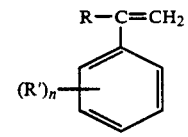

where R is alkyl of 1 to 8 carbon atoms or hydrogen, R' is alkyl of 1 to 8 carbon atoms and n is 0, 1, 2 or 3, or of methyl methacrylate or of a mixture thereof and A2: from 4 to 40, in particular from 10 to 30, % by weight of acrylonitrile, methacrylonitrile, methyl methacrylate, maleic anhydride or a mixture thereof, A3: from 1 to 30% by weight of a monomer selected from the group consisting of the monomers of the general formula I or II or of the heterocylic nitrogen-containing monomers N-vinylimidazole and N-vinyl-carbazole

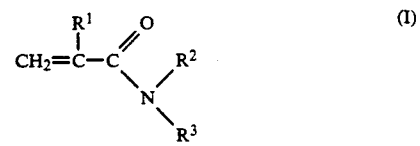

$$R^4-N(-CH_2)_n-R^6-CH=CH_2 \quad (II)$$
$$\overset{|}{R^5}$$

where $R^1$, $R^2$ and $R^3$ are each hydrogen, $CH_3$, $C_2H_5$, $C_3H_7$, $C_4H_9$, phenyl, $CF_3$ or phenyl-$C_1$-$C_4$-alkyl, $R^4$ and $R^5$ are each hydrogen or $C_1$-$C_8$alkyl, $R^6$ is

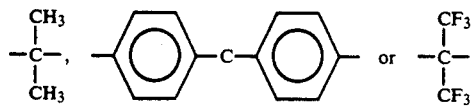

and n may be 0-10, and

A4: up to 40% by weight of one or more copolymerizable ethylenically unsaturated monomers, B: from 10 to 90% by weight of one or more copolymers having a glass transition temperature below 0° C. and consisting of B1: from 50 to 99.9% by weight of one or more alpha-olefins selected from the group consisting of ethylene, propene, 1-butene, isobutene, 1-pentene and 1-hexene, B2: from 0.1 to 50% by weight of one or more monomers containing acid groups and B3: up to 40% by weight of one or more copolymerizable ethylenically unsaturated monomers, C: up to 80% by weight of one or more copolymers having a glass transition temperature above 0° C. and consisting of C1: from 50 to 95% by weight of styrene or substituted styrenes or methyl methacrylate or a mixture thereof and C2: from 5 to 50% by weight of (meth)acrylonitrile, methyl methacrylate, maleic anhydride or a mixture thereof and D: up to 80% by weight of at least one polycarbonate.

Copolymer A contains polymerized units of nitrogen-containing monomers.

The ratio of monomers forming rigid components to monomers containing nitrogen groups (A1+A2):A3 is preferably from 20:1 to 2:1, particularly preferably from 10:1 to 5:1 (based on the weight).

On the other hand, the ratio of polymers of alpha-olefins to monomers containing acid groups (B1:B2) is preferably from 99:1 to 5:1, in particular from 95:5 to 10:1.

Preferred polymers A are copolymers of styrene, alpha-methylstyrene, p-methylstyrene (A1); methyl methacrylate, maleic anhydride, (meth)acrylonitrile (A2) and N,N-dimethylaminoethyl acrylate, N,N-dimethylaminoethyl methacrylate, 3-methyl-3-aminoprop-1-ene, N-vinylcarbazole and N-vinylimidazole (A3), where one or more monomers A2 may be polymerized with one or more monomers A3 and, if required, with further copolymerizable ethylenically unsaturated monomers. However, all copolymers which have a glass transition temperature ($T_g$) above 0° C. and are provided with basic groups as described are suitable.

The amount of base-containing component A3 is preferably 1-30, particularly preferably 2-20, % by weight, based on A. These copolymers can be prepared by all conventional polymerization processes, for example mass, suspension, solution, precipitation or emulsion polymerization.

Preferred polymers B are acid-modified copolymers of ethylene, propylene, 1-butene, isobutylene, 1-pentene and 1-hexene (B1) with ethylenically unsaturated monomers containing acid groups, such as acrylic acid, (meth)acrylic acid, vinylbenzoic acid or vinylsulfonic acid (B2), where one or more monomers B1 can be copolymerized with one or more monomers B2 and, if required, with further ethylenically unsaturated monomers B3. However, all copolymers which have a glass transition temperature $T_g$ below 0° C. and are provided with acid-containing groups are suitable.

The amount of the monomers B2 containing acid groups is from 0.1 to 50, preferably from 1 to 40, % by weight, based on B.

The preparation of copolymers B is also generally known. Processes for the preparation of polyolefins are described in, for example, Ullmanns Enzyklopädie der technischen Chemie, 4th Edition, Volume 19, pages 167-226.

Particularly preferred polymers B are copolymers of ethylene with acrylic acid and/or methacrylic acid and/or the esters of these acids, for example with the methyl, ethyl, propyl, n-butyl, isobutyl, tert-butyl or 2-ethylhexyl esters. In addition, the rubbers may furthermore contain acid groups, for example in the form of dicarboxylic acids, derivatives of these acids, vinyl esters and vinyl ethers. Another possibility is the incorporation of epoxy-containing monomers by polymerization.

The ethylene content of the copolymers is in general from more than 50 to 99.9% by weight, and the amounts of acrylate and/or methacrylate are each from 2 to 50% by weight.

Examples of suitable copolymers are those consisting of from 50 to 99.9, in particular from 60 to 95, % by weight of ethylene, from 0.5 to 40, in particular from 3 to 20, % by weight of acrylic acid and/or maleic anhydride and from 0 to 40, in particular from 10 to 35, % by weight of n-butyl acrylate and/or 2-ethylhexyl acrylate.

The ethylene copolymers described above are prepared in a known manner, preferably by random copolymerization under high pressure and at elevated temperatures. Corresponding processes have been described.

The melt flow index of the ethylene copolymers is in general from 1 to 80 g/10 min (measured at 190° C. and under a load of 2.16 kg).

Copolymers, such as component A and component B, can, however, also be prepared by polymer-analogous reaction of polymers which do not contain acid or base groups with suitable reagents. Such reactions with macromolecules which permit the introduction of certain functional groups are described, for example, in the text book of H. G. Elias, Makromoleküle, Vol. 1, 5th Edition, Hüthig & Wepf 1990, page 558 et seq.

The novel thermoplastic molding materials may contain up to 80, preferably up to 50, % by weight of a thermoplastic copolymer C of from 50 to 95, preferably from 60 to 80, % by weight of styrene or substituted styrenes or methyl methacrylate or a mixture thereof (C1) and from 5 to 50, preferably from 20 to 40, % by weight of acrylonitrile, methacrylonitrile, methyl methacrylate, maleic anhydride or a mixture thereof (C2).

The copolymers C are resin-like, thermoplastic and rubber-free. Copolymers of styrene with acrylonitrile and possibly with methyl methacrylate, of α-methylstyrene with acrylonitrile and possibly with methyl methacrylate or of styrene and α-methylstyrene with acrylonitrile and possibly with methyl methacrylate and of styrene and maleic anhydride are particularly preferred. The simultaneous use of a plurality of copolymers is also possible.

Such copolymers C are otherwise known and can be prepared by free radical polymerization, in particular by emulsion, suspension, solution or mass polymerization. They have intrinsic viscosities of from 40 to 160, corresponding to weight average molecular weights $\overline{M}_w$ of from 40,000 to 2,000,000.

Component D

Thermoplastic aromatic polycarbonates D which are suitable according to the invention are those based on the known bisphenols of the structure

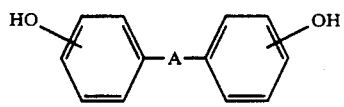

where A is a single bond, $C_1$-$C_3$-alkylene, $C_2$- or $C_3$-alkylidene, $C_3$-$C_6$-cycloalkylidene, —S— or —$SO_2$—.

Homopolycarbonates and copolycarbonates are suitable according to the invention.

The preparation of the polycarbonates is likewise known and can be carried out, for example with phosgene, by the phase boundary method or by the method in a homogeneous phase (ie. the pyridine process), the molecular weight to be established in each case being achieved in a known manner by means of a corresponding amount of known chain terminators. (With regard to polydiorganosiloxane-containing polycarbonates, see, for example, German Laid-Open Application DOS 3,334,782.)

Examples of suitable chain terminators are phenol and p-tert-butylphenol as well as long-chain alkylphenols, such as 4-(1,3-tetramethylbutyl)-phenol, according to German Laid-Open Application DOS 2,842,005 or mono- or dialkylphenols where the alkyl substituents have a total of 8 to 20 carbon atoms, according to German Laid-Open Application DOS 3,506,472, for example p-nonylphenol, 3,5-di-tert-butylphenol, p-tert-octylphenol, p-dodecylphenol, 2-(3,5-dimethylheptyl)-phenol and 4-(3,5-dimethylheptyl)-phenol.

Polycarbonates which are suitable according to the invention have a relative viscosity $\eta_{rel}$ of from 1.10 to 1.50, in particular from 1.25 to 1.40. This corresponds to an average molecular weight ($\overline{M}_w$) of from 10,000 to 200,000, preferably from 20,000 to 80,000.

Examples of suitable diphenols of the formula (I) are hydroquinone, resorcinol, 4,4'-dihydroxydiphenyl, 2,2-bis-(4-hydroxyphenyl)-propane, 2,4-bis-(4-hydroxyphenyl)-2-methylbutane and 1,1-bis-(4-hydroxyphenyl)-cyclohexane.

Preferred diphenols of the formula (I) are 2,2-bis-(4-hydroxyphenyl)-propane and 1,1-bis-(4-hydroxyphenyl)-cyclohexane.

Polycarbonates which are preferred according to the invention may be branched in a known manner, preferably as a result of the incorporation of from 0.05 to 2.0 mol %, based on the sum of the diphenols used, of compounds having three or more phenolic OH groups.

Preferred polycarbonates are the homopolymer of bisphenol A and the copolycarbonates of bisphenol A.

The novel thermoplastic molding materials are prepared by mixing the components. It may be advantageous to premix individual components. It is also possible to mix the components in solution and remove the solvents.

Suitable organic solvents for components A to D are, for example, chlorobenzene, mixtures of chlorobenzene and methylene chloride or mixtures of chlorobenzene and aromatic hydrocarbons, eg. toluene.

The solvent mixtures can be evaporated, for example, in devolatilization extruders.

Mixing apparatuses for carrying out the novel process are, for example, conventional tumble mixers or stirred mixers.

Suitable apparatuses for melt compounding are, for example, heated batchwise internal kneaders with or without a floating weight, continuous internal kneaders, screw mixers having axially oscillating screws, twin-screw mixers and mixing roll mills having heated rollers.

For example, single-screw and twin-screw extruders are particularly suitable for melt extrusion.

The novel thermoplastic molding materials can be processed by the known methods of thermoplastic processing, for example by extrusion, injection molding, calendering, blow molding, compression molding or sintering.

The following measuring methods were used for investigating the properties of the molding materials which are described in the Examples below:

The median particle size and the particle size distribution were determined from the integral mass distribution. The median particle sizes in all cases are the weight average of the particle sizes as determined using an analytical ultracentrifuge by the method according to W. Scholtan and H. Lange, Kolloid-Z. und Z.-Polymere 250 (1972), 782–796. The ultracentrifuge measurement gives the integral mass distribution of the particle diameter of a sample. This makes it possible to determine the percentage by weight of the particles which have a diameter equal to or smaller than a certain size. The median particle diameter, which is also referred to as the $d_{50}$ value of the integral mass distribution, is defined as the particle diameter at which 50% by weight of the particles have a smaller diameter than the $d_{50}$ values and 50% by weight have a larger diameter.

The melt flow index MFI in [g/10 min] was determined according to DIN 53,735 at 190° C. and under a load of 2.16 kg.

The intrinsic viscosities in [$cm^3$/g] were determined at 23° C. using a 0.5% strength solution in methyl ethyl ketone. Gel fractions were removed before the measurement by centrifuging, and the sample weight was corrected correspondingly.

Component A

An emulsion polymer of styrene, acrylonitrile and N,N-dimethylaminoethyl acrylate (DMAEA) was prepared as each of the components A-1 and A-2.

The emulsion polymers of styrene, acrylonitrile and N-vinylimidazole (NVI) were prepared as components A-3 to A-6 (with different amounts in each case). Components A-1 to A-6 were prepared by the following method: 1 g of a sodium salt of a $C_{12}$–$C_{18}$-paraffinsulfonic acid, 0.3 g of potassium peroxodisulfate, 0.3 g of $NaHCO_3$ and 0.15 g of sodium pyrosulfate in 150 g of demineralised water were initially taken and heated to T=75° C. The monomer mixtures stated in Table 1 were added dropwise in the course of 3 hours, after which stirring was carried out for 1 hour. The latex obtained had a solids content of 40% and a median particle size d₅₀ of 85 nm. The particle size distribution was narrow. The composition of the remaining copolymers A is shown in the Table below.

TABLE

| Component A | Copolymers with nitrogen-containing monomers | | | |
|---|---|---|---|---|
| | Styrene (g) | Acrylonitrile (g) | NVI (g) | DMAEA (g) |
| A-1 | 74 | 25 | 1 | — |
| A-2 | 73.5 | 24.5 | 2 | — |
| A-3 | 74 | 25 | — | 1 |
| A-4 | 73.5 | 24.5 | — | 2 |
| A-5 | 71.25 | 23.75 | — | 5 |
| A-6 | 67.5 | 22.5 | — | 10 |

Component B

A copolymer of 88% by weight of ethylene, 8% by weight of n-butyl acrylate and 4% by weight of acrylic acid, having a density of 0.925 g/cm³ at 23° C. and a melt flow index MFI (190/2.16) of 6 g/min, was used as component B.

Component C

A copolymer of styrene and acrylonitrile in a weight ratio of 65:35, having an intrinsic viscosity of 81 ml/g (23° C. in dimethylformamide), prepared by continuous solution polymerization by a process as described for example, in Kunststoff-Handbuch, Vieweg-Daumiller, Volume V (Polystyrol), Carl-Hanser-Verlag, Munich 1969, page 124, line 12 et seq., was used as component C.

Preparation of the thermoplastic molding materials

The components were mixed in dried form in a fluid mixer and extruded at 260° C. in a twin-screw extruder (ZSK 30 from Werner & Pfleiderer). The required test specimens were produced therefrom by injection molding at 250° C.

We claim:

1. A thermoplastic molding material comprising, based on the sum of A, B, C and D,
   A: from 10 to 90% by weight of one or more copolymers having a glass transition temperature above 0° C. and consisting of
   A1: from 30 to 95% by weight of styrene or of a substituted styrene,
   A2: from 4 to 40% by weight of acrylonitrile, methacrylonitrile, methyl methacrylate, maleic anhydride or a mixture thereof,
   A3: from 1 to 30% by weight of a monomer selected from the group consisting of the monomers of the formula I or II or of the heterocylic nitrogen-containing monomers N-vinylimidazole and N-vinylcarbazole

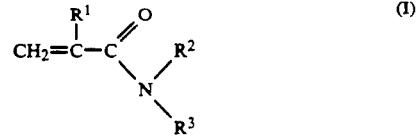

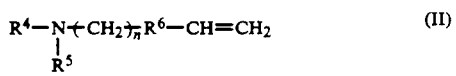

where R¹, R² and R³ are each hydrogen, CH₃, C₂H₅, C₃H₇, C₄H₉, phenyl CF₃ or phenyl-C₁-C₄-alkyl, R⁴ and R⁵ are each hydrogen or C₁-C₈-alkyl, R⁶ is

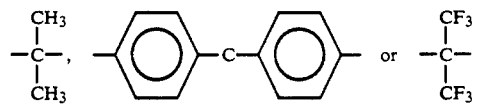

and n may be 0–10, and
   A4: up to 40% by weight of one or more copolymerizable ethylenically unsaturated monomers,
   B: from 10 to 90% by weight of one or more copolymers having a glass transition temperature below 0° C. and consisting of
   B1: from 50 to 99.9% by weight of one or more alpha-olefins selected from the group consisting of ethylene, propene, 1-butene, isobutene, 1-pentene and 1-hexene,
   B2: from 0.1 to 50% by weight of one or more monomers containing acid groups and
   B3: up to 40% by weight of one or more copolymerizable ethylenically unsaturated monomers,
   C: up to 80% by weight of one or more copolymers having a glass transition temperature above 0° C. and consisting of
   C1: from 50 to 95% by weight of styrene or substituted styrenes or a mixture thereof and
   C2: from 5 to 50% by weight of (meth)acrylonitrile, methyl methacrylate, maleic anhydride or a mixture thereof and
   D. up to 80% by weight of at least one polycarbonate.

* * * * *